_United States Patent Office_ 3,076,819
Patented Feb. 5, 1963

3,076,819
PROCESS FOR THE PRODUCTION OF
ETHER AMINES
Rudolf Heise, Dusseldorf-Holthausen, Germany, assignor to Dehydag, Deutsche Hydrierwerke G.m.b.H., Dusseldorf, Germany, a corporation of Germany
No Drawing. Filed Nov. 19, 1959, Ser. No. 853,991
Claims priority, application Germany Nov. 21, 1958
5 Claims. (Cl. 260—347.7)

This invention relates to a process for producing ether amines by condensing alkyl nitriles with alcohols and reducing the condensation product to obtain the amine. It more particularly relates to a process where the condensation catalyst is ammonia, the reduction is carried by hydrogen in the presence of a catalyst, and both reactions are performed simultaneously in the same reaction chamber or successively therein without separation of the condensation product.

It is known that the reaction between acrylonitrile and monovalent alcohols leads to 3-alkoxy-propionic acid nitriles through addition of an alcohol molecule to the reactive double bond of the acrylonitrile. An essential prerequisite for the performance of this reaction heretofore was the presence of a strongly alkaline-acting catalyst. Examples of such catalysts which are described in the literature are sodium, sodium oxide, sodium hydroxide, potassium hydroxide, sodium methylate, as well as the very strong base trimethylbenzyl ammonium hydroxide.

It has now been surprisingly found that the condensation of acrylonitrile with alcohols may be accomplished in the same manner by using gaseous ammonia in place of the above-mentioned strong alkaline catalysts. This discovery was the more surprising because, on the one hand, it could not have been expected from the prior art that the very weakly alkaline ammonia would produce a catalytic effect and, on the other hand, because the possibility of an addition reaction between the ammonia and the double bond of the acrylonitrile could not have been excluded, especially since it is known that this addition reaction proceeds practically quantitatively and very readily in an alcoholic medium, very often without the addition of heat (Zeitschrift für Agnew. Chem. 61, 1949, page 234). In addition to the novelty of the present process, the use of gaseous ammonia represents a substantial technical advance because it is simpler and less dangerous to handle, easier to dose and, in contrast to the above mentioned catalysts, may be removed from the reaction product by simple evaporation.

It is also known that 3-alkoxy-propionic acid nitriles may be reduced to the corresponding amines. For this purpose hydrogen, which has either been catalytically activated with heavy metals or which has been produced from alcohol and sodium, has been used. In both cases a previous isolation of the nitrile was required unless the condensation product containing the alkaline catalyst is neutralized and subsequently catalytically hydrogenated, as has already been proposed. However, this means that the production of 3-alkoxy-propylamine from acrylonitrile involves in every case at least three steps, namely either condensation, neutralization, distillation and hydrogenation or condensation, neutralization and hydrogenation. The yields of 3-alkoxypropyl-amines which have been obtained by the previously known hydrogenation processes are between about 23 and 65% of theory, based upon the amount of acrylonitrile originally employed; the yields from the sodium reduction method are still poorer, namely between about 21 and 55% of theory, based on the corresponding 3-alkoxy-propionic acid nitrile.

The discovery that ammonia is suitable as a catalyst for the condensation of acrylonitriles with alcohols also provides a much simpler method for the production of the corresponding amines. It has been found that the 3-alkoxypropylamines may be produced by a single step method and with considerably improved yields than those obtained from the previously known methods, by combining the condensation of acrylonitrile with alcohols in the presence of gaseous ammonia with the hydrogenation.

For this purpose it is possible to introduce the acrylonitrile and the alcohol together with the hydrogenation catalyst into an autoclave, introduce gaseous ammonia and subsequently, hydrogen under pressure and, after heating the contents to the hydrogenation temperature, hydrogenating until hydrogen absorption no longer takes place. In this method the condensation takes place for all practical purposes during the introduction of the ammonia under pressure as well as during heating of the contents of the autoclave to the hydrogenation temperature. If less reactive alcohols are used, the process may be carried out by first heating the acrylonitrile and the alcohol together with the hydrogenation catalyst and the ammonia alone for a short period of time to temperatures of 30° to 60° C. and subsequently adding the hydrogen and heating the contents of the autoclave to the hydrogenation temperature.

In place of acrylonitrile, methacrylonitrile and other nitriles containing reactive double bonds are equally suitable for this reaction.

Suitable hydroxyl compounds are preferably the monovalent primary and secondary members of the aliphatic, cycloaliphatic, fatty aromatic and heterocyclic series. These alcohols may be saturated or unsaturated, straight or branched chain, substituted or interrupted in the carbon chain by hetero atoms. Specific examples of such alcohols are: methanol, butanol, 2-ethylhexanol, dodecanol, stearyl alcohol, oleyl alcohol, methoxy ethanol, cyclohexanol, benzyl alcohol, tetrahydrofurfuryl alcohol and the like; other suitable materials are mixtures of alcohols such as those which are obtained by reduction of naturally occuring as well as synthetic fatty acids; also suitable are oxo-alcohols which are obtained from olefins as well as Guerbet alcohols, which are obtained from lower alcohols by the Guerbet process and the like.

The acrylonitrile and alcohol are admixed in equimolecular ratios. If one of the two components, especially the alcohol component, is used in small excesses, a further increase in the yield can be effected.

The ammonia which is used as the catalyst in the condensation reaction may be used in liquid as well as in gaseous form. Most advantageously, however, gaseous ammonia is used and the pressure of the ammonia should be from 1 to 8 atmospheres' gauge, preferably from 5 to 8 atmospheres' gauge.

For the hydrogenation of the 3-alkoxy-propionic acid nitriles into the 3-alkoxy-propylamines, primarily cobalt and nickel but also other hydrogenation catalysts may be used, that is the same catalysts which are employed in the production of fatty amines from fatty acid nitriles. The required quantity is about 1 to 10%, preferably about 5%, based upon the amount of acrylonitrile used. Suitable hydrogenation temperatures have been found to be temperatures between 30 and 180° C., especially from 90 to 140° C. The hydrogenation may be carried out at a pressure of 30 to 300 atmospheres' gauge preferably from 60 to 200 atmospheres' gauge. Under these conditions about 1 to 2 hours are required for a complete transformation of the nitrile group into the amino group.

It has already been proposed to perform the hydrogenation in the presence of liquid ammonia in order to reduce the formation of secondary amines (loc. cit.). Since the ammonia, which is used as a catalyst for the condensation of acrylonitrile with alcohol according to the present invention, remains in the reaction product, further addition of ammonia prior to hydrogenation is not necessary.

After the hydrogenation is completed the reaction product is filtered and distilled. The 3-alkoxy-propylamine formed by the reaction is obtained in the form of a colorless liquid. In general, the yield is very good and may reach 95% of theory, based upon the amount of acrylonitrile originally used.

Thus, the present process opens the way to a very advantageous method of producing ether amines of the type represented by the general structural formula

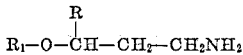

wherein R represents a hydrogen atom or an alkyl and $R_1$ is an alkyl, a cycloaliphatic, an aromatic or a heterocyclic radical.

The individual compounds and mixtures thereof, either in the free state as well as in the form of their derivatives, have already found a multitude of utilities, for example as emulsifiers, solvents, plasticizers, wetting agents, washing agents, cleaning agents, and lubricating agents, as antioxidants and anticorrosion agents, as insecticides, pharmaceuticals and pickling agents, as textile agents and auxiliary floatation agents as well as for many other purposes.

The following specific examples are given to illustrate my invention and to enable persons skilled in the art to better understand the invention and are not intended to be limitative.

Example I 200 gm. acrylonitrile, 200 gm. methanol and 10 gm. Raney nickel were placed into an autoclave provided with a stirrer. After introducing gaseous ammonia until the pressure reached 8 atmospheres' gauge and hydrogen until the pressure reached 50 atmospheres' gauge, the autoclave was rapidly heated to 90° C. Due to the increase in the temperature the internal pressure first rose somewhat, but then again dropped because of the hydrogen which was absorbed; by adding additional hydrogen the pressure was maintained at 60 atmospheres' gauge until absorption of hydrogen no longer took place. The contents of the autoclave were then cooled, filtered and distilled. 3-methoxy-propylamine having a boiling point of 119° C. were obtained with a yield of 65% of theory, based on the amount of acrylonitrile.

When the same starting materials were heated to 150° C. after introducing 8 atmospheres' gauge ammonia and thereafter hydrogenated at 200 atmospheres' gauge, the yield of 3-methoxy-propylamine rose to 95% of theory, based on the acrylonitrile.

Example II 320 gm. acrylonitrile, 330 gm. ethanol and 16 gm. Raney nickel were placed into an autoclave, ammonia was introduced until the pressure reached 5 atmospheres' gauge, and these contents were first heated for 2 hours at 50° C. Thereafter, hydrogen was introduced under pressure and the contents were hydrogenated at 140° C. and 200 atmospheres' gauge until saturated. Upon distillation of the reaction product 555 gm. which corresponds to 90% of theory, of 3-ethoxy-propylamine having a boiling point of 134° C. were obtained.

In the same manner as described above the following were produced:

3-propoxy-propylamine (boiling point 50° C. at 13 mm. Hg), 3-butyoxy-propylamine (boiling point 65° C. at 13 mm. Hg).

3-octyloxy-propylamine (boiling point 125° C. at 13 mm. Hg).

3-(2-ethyl-hexyl)-oxy-propylamine (boiling point 78° C. at 1 mm. Hg) and 3-decyl-oxy-propylamine (boiling point 152° C. at 13 mm. Hg).

Example III 133 gm. (2.5 mols) acrylonitrile, 560 gm. (3.0 mols) lauryl alcohol and 13 gm. Raney cobalt were placed into an autoclave provided with a stirrer and were maintained under an ammonia pressure of 8 atmospheres' gauge for 2 hours at 25° C. Subsequently, the contents were hydrogenated at 140° C. and a pressure of 200 atmospheres gauge until saturation. The yield of pure 3-dodecyl-oxy-propylamine having a boiling point of 140° C. at 3 mm. Hg was 77% of theory.

When the condensation was carried out at 50° C. instead of at 25° C., the yield rose to 85% of theory.

Using quantitative ratios analogous to those used above, the following were produced:

3-(methoxyethyl)-oxy-propylamine (boiling point 79° C. at 12 mm. Hg) and 3-(ethoxyethyl)-oxy-propylamine (boiling point 122 to 124° C. at 20 mm. Hg).

Example IV

Using a mixture of 160 gm. (3.0 mols) acrylonitrile, 465 gm. (2.5 mols) lauryl alcohol and 16 gm. Raney nickel, that is using an excess of acrylonitrile, the yield under the reaction conditions described in Example III was on the average 20% lower.

Example V 212 gm. acrylonitrile, 480 gm. cyclohexanol and 10 gm. Raney nickel were heated to 120° C. after introducing 5 atmospheres' gauge of ammonia and 75 atmospheres' gauge of hydrogen and were then hydrogenated under pressure of 100 atmospheres' gauge. The yield of 3-cyclohexyl-oxy-propylamine having a melting point of 115 to 117° C. at 20 mm. Hg was 53% of theory.

In the same manner the following were produced:

3-(3,5-dimethyl-cyclohexyl)-oxy-propylamine (boiling point 90 to 92° C. at 1 mm. Hg), and 3-benzyloxy-propylamine (boiling point 99 to 100° C. at 1 mm. Hg).

Example VI 212 gm. acrylonitrile, 490 gm. tetrahydrofurfuryl alcohol and 10 gm. Raney nickel were condensed at 50° C. for 2 hours, after introducing 8 atmospheres' gauge of ammonia and were then hydrogenated at 140° C. and 200 atmospheres' gauge. Upon working up the reaction mixture the yield of 3-tetrahydrofurfuryl-propylamine having a boiling point of 86 to 89° C. at 3 mm. Hg was 46% of theory, based on the acrylonitrile.

While I have set forth certain specific embodiments and preferred modes of practice of my invention, it will be understood that the invention is not limited thereto, and that various changes and modifications may be made in the invention without departing from the spirit of the disclosure or the scope of the appended claims.

I claim:

1. A process for the production of ether amines having the structural formula:

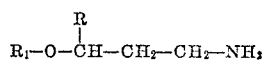

wherein R is a hydrogen atom and $R_1$ is selected from the group consisting of alkyl, cyclohexyl, benzyl and tetrahydrofurfuryl radicals which comprises condensing acrylonitrile with an excess of a monovalent alcoholic compound selected from the group consisting of alkanols, cyclohexanol, benzyl alcohol and tetrahydrofurfuryl alcohol in the presence of about 1 to 8 atmospheres' gauge of ammonia and catalytically hydrogenating the ether nitrile thus obtained in the presence of hydrogen and a hydrogenation catalyst at pressures of about 30 to 300 atmospheres' gauge and at a temperature of about 30 to 180° C.

2. A process for the production of 3-alkoxy-propylamine which comprises condensing acrylonitrile with an excess of an alkanol compound in the presence of about 1 to 8 atmospheres' gauge of ammonia and catalytically hydrogenating the ether nitrile thus obtained in the presence of hydrogen and a hydrogenation catalyst at pressures of about 30 to 300 atmospheres' gauge and at a temperature of about 30 to 180° C.

3. A process for the production of 3-cyclohexyloxy-propylamine which comprises condensing acrylonitrile with an excess of cyclohexyl alcohol in the presence of about 1 to 8 atmospheres' gauge of ammonia, and catalytically hydrogenating the ether nitrile thus obtained in the presence of hydrogen and a hydrogenation catalyst at pressures of about 30 to 300 atmospheres' gauge and at a temperature of about 30 to 180° C.

4. A process for the production of 3-benzyloxy-propyl-amine which comprises condensing acrylonitrile with an excess of benzyl alcohol in the presence of about 1 to 8 atmospheres' gauge of ammonia, and catalytically hydrogenating the ether nitrile thus obtained in the presence of hydrogen and a hydrogenation catalyst at pressures of about 30 to 300 atmospheres' gauge and at a temperature of about 30 to 180° C.

5. A process for the production of 3-tetrahydro-furfuryl-oxy-propyl amine which comprises condensing acrylonitrile with an excess of tetrahydrofurfuryl alcohol in the presence of about 1 to 8 atmospheres' gauge of ammonia, and catalytically hydrogenating the ether nitrile thus obtained in the presence of hydrogen and a hydrogenation catalyst at pressures of about 30 to 300 atmospheres' gauge and at a temperature of about 30 to 180° C.

References Cited in the file of this patent

UNITED STATES PATENTS

| | | |
|---|---|---|
| 1,992,615 | Hoffmann et al. | Feb. 26, 1935 |
| 2,160,578 | Schmidt | May 30, 1939 |
| 2,280,792 | Bruson | Apr. 28, 1942 |

OTHER REFERENCES

Bayer: Angew. Chem., vol. 61 (1949), page 234.

Bruson: Organic Reactions, vol. 5 (1949), pp. 90, 96 and 108.